(No Model.)
R. C. WRIGHT & F. J. CRANE.
BICYCLE SADDLE.
No. 537,375.　　　　　　　　　　Patented Apr. 9, 1895.
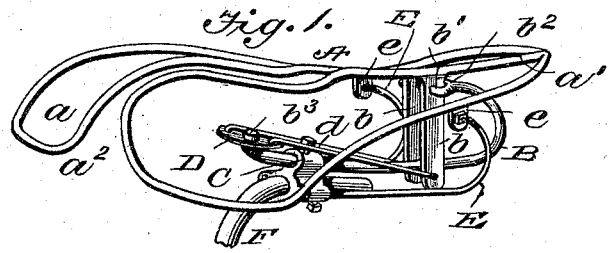
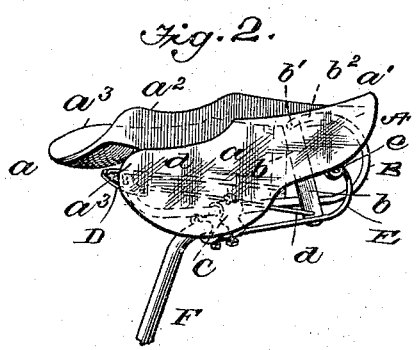　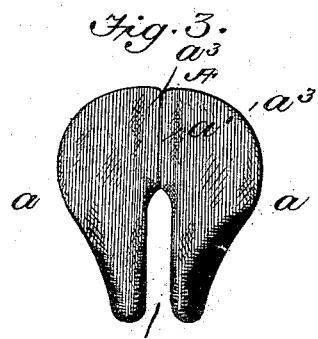
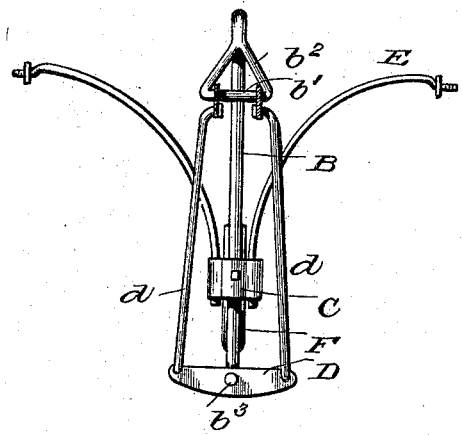
Witnesses　　　　　　　　　　　　Inventors

UNITED STATES PATENT OFFICE.

ROBERT C. WRIGHT AND FRANCIS J. CRANE, OF DENVER, COLORADO.

BICYCLE-SADDLE.

SPECIFICATION forming part of Letters Patent No. 537,375, dated April 9, 1895.

Application filed April 28, 1893. Serial No. 472,276. (No model.)

*To all whom it may concern:*

Be it known that we, ROBERT C. WRIGHT and FRANCIS J. CRANE, citizens of the United States, residing at Denver, in the county of Arapahoe and State of Colorado, have invented a new and useful Bicycle-Saddle, of which the following is a specification.

This invention contemplates certain new and useful improvements in bicycle saddles, and it has for its objects, first, the production of a saddle which will readily adjust itself to the motion of the rider's body, and, secondly, to remove pressure from the prostatic gland and urethra of the rider.

The invention comprises a saddle formed in two parts or sections and pivotal connections between the same whereby said parts have a reciprocal movement relative to each other.

The invention further comprises a saddle formed in two parts or sections and having central meeting edges and a forward space or opening.

The invention also comprises the details of construction, combination and arrangement of parts, substantially as hereinafter fully set forth and particularly pointed out in the claims.

In the accompanying drawings:—Figure 1 is a view in perspective of an improved saddle, with the seat covers removed. Fig. 2 is a similar view showing the relative position of the parts when in use. Fig. 3 is a top plan view of the seat frame. Fig. 4 is a similar view of the operative parts of the saddle, the seat frames being removed.

Referring to the drawings, A designates the saddle-seat composed of two separate frames $a$. The inner, parallel edges $a'$ of these frames meet, as shown at Fig. 3, for a portion of their length, and at their forward ends they are separated so as to form a space or opening $a^2$. Each of these frames or seat-sections is curved downwardly and outwardly at its rear end $a^3$, while its forward end is slightly elevated so as to conform to the rider. From the inner bars of the seat frames depend arms $b, b$, and through holes in the upper ends thereof is passed the cross-bar $b'$ of a triangular end $b^2$ of a supporting rod B. This rod B is bent or curved outward so as to give it a spring tension and is then carried rearward between the arms $b$ and passed through the upper socket of a clip C, its end being extended beyond said clip and bent upwardly to form a lug $b^3$.

D is a lever fulcrumed at its center on the lug $b^3$ of rod B, and to its ends are connected links $d, d$, which at their forward ends are attached to the lower ends of arms $b$.

E, E, are two spring-arms rigidly held at their inner ends in the side sockets of clip C. These arms are carried forward and bent or curved back and attached at their free ends to apertured lugs $e$ of the outer side bars of seat-frames $a$. The clip C is attached to saddle-post F, the end of the latter fitting in the lower socket of said clip.

From what has been said it will be seen that upon pressure being applied one seat frame will move in a direction opposite to the other and assume a counter position thereto. For instance, as shown in Fig. 2, if the rider throws his weight upon the right pedal the front end of the right frame will follow the direction of the foot, while the back portion of said frame will rise and follow the direction of that part of the body normally in contact therewith. At the same time the left-frame is having a reverse movement. This is effected by the pivot support given the seat-frames by the forward end of rod B, and the connection between the depending arms $b$ and the lever D.

The advantages of our invention are apparent to those skilled in the art to which it appertains.

It will be specially observed that by means of a saddle constructed as herein stated all pressure is removed from the prostatic gland and urethra and the hygienic properties prevent danger to the rider.

By causing the inner edges of the seat sections to meet throughout the rearmost half of the saddle no inconvenience is caused the rider by the catching of his clothing between the two parts or sections and the latter are free to move in alternate reciprocal relation. The space or opening throughout the forward half of the saddle is formed by the inner edges of the parts or sections being bent or curved apart from about the center of the saddle and extended parallel to the forward end thereof.

A saddle of this character is extremely simple and inexpensive and not liable to readily get out of order or be deranged.

We claim as our invention—

1. A bicycle-saddle formed in two parts or sections pivotally mounted, said parts or sections comprising frame-bars having their inner adjacent edges meeting, or approximately so, for a portion of their length and bent or curved from about the center to the forward end to form a space or opening, as $a^2$ and supports connected to the outer portions of said frame-bars, substantially as set forth.

2. A bicycle saddle pivoted and divided longitudinally into two corresponding parts or sections, and means connecting said parts or sections whereby they are caused to move in alternate reciprocal relation, as set forth.

3. A bicycle saddle comprising the seat frame formed in two parts or sections, a support for said parts or sections, and pivoted connections between said parts or sections, causing reciprocal movements thereof substantially as set forth.

4. A bicycle saddle having its seat formed in two parts or sections, a supporting rod for said parts or sections, spring arms also supporting said parts or sections, and connections between said parts or sections, for causing reciprocal movements thereof, substantially as set forth.

5. A bicycle saddle having its seat-frame formed in two parts or sections, a supporting rod for said parts or sections, spring arms also supporting said parts or sections, a lever fulcrumed on said supporting rod, and connections between said lever and said parts or sections, substantially as set forth.

6. A bicycle saddle having its seat-frame formed in two parts or sections and provided with depending arms, a supporting rod for said arms, spring arms connected to said parts or sections, a lever fulcrumed on said supporting rod, and links connecting the ends of said lever with said depending arms, substantially as set forth.

7. A sectional bicycle saddle having depending arms, a supporting rod passed through said depending arms, a clip for said rod, spring arms held by said clip and attached to the sides of the saddle, a lever fulcrumed on said rod and pitmen connecting the ends of said levers to the lower ends of said depending arms, substantially as set forth.

R. C. WRIGHT.
F. J. CRANE.

Witnesses:
BAZIL RUSSELL,
DUTTON WANSOR.